United States Patent
Wen et al.

(10) Patent No.: US 11,402,043 B2
(45) Date of Patent: Aug. 2, 2022

(54) EXHAUST BELLOWS INSTALLATION TOOL

(71) Applicant: Caterpillar Inc., Peoria, IL (US)

(72) Inventors: Quan Wen, Lafayette, IN (US); Wen Zhong, West Lafayette, IN (US); Mark Andrew Pusey, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/952,469

(22) Filed: Nov. 19, 2020

(65) Prior Publication Data

US 2021/0071790 A1   Mar. 11, 2021

Related U.S. Application Data (62) Division of application No. 16/264,973, filed on Feb. 1, 2019, now Pat. No. 10,865,920.

(51) Int. Cl.
| | |
|---|---|
| *F16L 27/11* | (2006.01) |
| *B23P 19/10* | (2006.01) |
| *B25B 27/14* | (2006.01) |
| *B25B 27/28* | (2006.01) |
| *F16L 27/10* | (2006.01) |

(52) U.S. Cl.
CPC ............... *F16L 27/11* (2013.01); *B23P 19/10* (2013.01); *B23P 2700/50* (2013.01)

(58) Field of Classification Search
CPC ...... B23P 19/10; B23P 2700/50; B25B 27/28; B25B 27/14; F16L 27/11; F16L 27/1004
See application file for complete search history.

(56) References Cited

U.S. PATENT DOCUMENTS

| | | | | |
|---|---|---|---|---|
| 2,444,988 A | * | 7/1948 | Guarnaschelli | F16L 11/115 285/55 |
| 2,721,746 A | * | 10/1955 | Schindler | F16L 51/035 285/228 |
| 2,865,403 A | * | 12/1958 | Le Vantine | F16L 11/02 138/121 |
| 3,029,094 A | * | 4/1962 | Parlasca | F16L 51/027 285/114 |
| 3,044,805 A | * | 7/1962 | Mcdonald | F16L 51/027 285/45 |
| 3,219,365 A | * | 11/1965 | Webb | F16L 27/111 285/45 |
| 3,232,640 A | * | 2/1966 | Donkle, Jr. | F16L 27/111 285/93 |
| 3,747,367 A | * | 7/1973 | Muller | F16D 3/74 464/79 |
| 3,834,741 A | * | 9/1974 | Drake | F16L 51/027 285/226 |

(Continued)

FOREIGN PATENT DOCUMENTS

| | | |
|---|---|---|
| EP | 664416 | 7/1995 |
| JP | 11022457 | 1/1999 |
| JP | 2018044475 | 3/2018 |

*Primary Examiner* — Bayan Salone
(74) *Attorney, Agent, or Firm* — Law Office of Kurt J. Fugman LLC (57) ABSTRACT

A method for aligning different portions of a conduit includes adjustably holding a first portion of a conduit in a first position, adjustably holding a second portion of a conduit in a second position relative to the first position of the first portion of the conduit, and inserting a bellows installation tool between the first portion of the conduit and the second portion of the conduit.

20 Claims, 9 Drawing Sheets

(56) References Cited

U.S. PATENT DOCUMENTS

| | | | | | |
|---|---|---|---|---|---|
| 3,842,865 | A | * | 10/1974 | Torricelli | F16L 27/0857 138/121 |
| 3,976,312 | A | * | 8/1976 | Murphree | F16L 51/027 285/45 |
| 4,204,707 | A | * | 5/1980 | Lincicome | B60H 1/00571 138/121 |
| 4,243,253 | A | * | 1/1981 | Rogers, Jr. | F16L 27/111 285/114 |
| 4,376,549 | A | * | 3/1983 | Cole | F16L 51/028 285/114 |
| 4,791,963 | A | * | 12/1988 | Gronert | F16L 11/115 138/106 |
| 4,911,206 | A | * | 3/1990 | Gropp | F16J 3/048 138/110 |
| 4,938,726 | A | * | 7/1990 | Bland | B63H 20/02 440/112 |
| 5,159,811 | A | * | 11/1992 | Hefler | F01N 13/1811 285/187 |
| 5,437,479 | A | * | 8/1995 | Hartling | F16L 27/111 285/49 |
| 5,769,463 | A | * | 6/1998 | Thomas | F01N 13/1816 285/49 |
| 5,782,506 | A | * | 7/1998 | Uematsu | F16L 27/11 285/227 |
| 5,806,899 | A | * | 9/1998 | Norikawa | F16L 27/11 285/299 |
| 5,813,704 | A | * | 9/1998 | Naito | F16L 27/11 285/226 |
| 5,842,723 | A | * | 12/1998 | Hartling | F01N 13/1811 285/49 |
| 6,156,140 | A | * | 12/2000 | Ayres | B29C 61/025 156/259 |
| 6,282,887 | B1 | * | 9/2001 | Polushin | F02K 9/42 239/127.3 |
| 6,631,928 | B1 | * | 10/2003 | Sakata | F16L 27/1085 285/226 |
| 6,902,202 | B2 | * | 6/2005 | Huber | F01N 13/1805 285/226 |
| 6,948,744 | B2 | * | 9/2005 | Atansoski | F01N 13/1811 285/226 |
| 7,264,280 | B2 | * | 9/2007 | Kim | F01N 13/1816 285/226 |
| 8,464,435 | B2 | * | 6/2013 | Johnson | F16L 51/02 33/600 |
| 8,613,450 | B2 | * | 12/2013 | Sato | F16J 15/3464 277/401 |
| 2010/0154397 | A1 | * | 6/2010 | Brinkmeyer | F01N 13/1816 60/324 |
| 2012/0318371 | A1 | * | 12/2012 | Rynders, Jr | F16L 51/027 137/15.01 |

* cited by examiner

EXHAUST BELLOWS INSTALLATION TOOL

CROSS-REFERENCE TO RELATED APPLICATIONS

This application is a Divisional of prior pending U.S. application Ser. No. 16/264,973, filed on Feb. 1, 2019, the disclosure of which is hereby incorporated by reference in its entirety.

TECHNICAL FIELD

The present disclosure relates to a method and apparatus for installing exhaust bellows used to connect various parts of the exhaust system of an internal combustion engine and the like. Specifically, the present disclosure relates to an exhaust bellows installation tool that is used to align various parts of the exhaust system before the bellows is installed to connect the aligned parts of the exhaust system.

BACKGROUND

Internal combustion engines are often used in earth moving, construction and mining equipment and the like. These engines typically have an exhaust system that conveys the exhaust to other parts of the engine (e.g. a turbo) or to an exhaust treatment device. Such exhaust systems may include long channels that are separated from each other and connected to each other by bellows to aid in assembling the engine and the exhaust system.

The bellows may require that sections of the exhaust manifold be aligned with high precision (e.g. 1 mm-2 mm) to help reduce the risk that the bellows will crack over time. If such a crack does develop, then the engine will require maintenance leading to undesirable downtime.

Accordingly, various tools have been developed to aid in creating the desired alignment so the problem of cracks developing in the bellows may be ameliorated. For example, U.S. Pat. No. 8,464,435 is directed to a gauge that may be used to facilitate the proper installation of a flexible bellow in a vehicle between an engine and an exhaust treatment system of the vehicle and a method of using the gauge to facilitate proper installation of the flexible bellows. However, this apparatus and method require that the user use measuring scales to evaluate whether the alignment is accurate enough without really helping the correct alignment to happen.

Accordingly, it is desirable that an apparatus and method that is easier and faster to provide the desired alignment be developed.

SUMMARY

A bellows installation tool according to an embodiment of the present disclosure is provided. The bellows installation tool may comprise a spacer defining a longitudinal axis and a fixed axial length, an inner sleeve that is at least partially disposed about the spacer, an outer sleeve that is at least partially disposed about the inner sleeve, a first flange that is disposed axially proximate the inner sleeve and that is operatively associated with the inner sleeve, and a second flange that is disposed axially proximate the outer sleeve and that is operatively associated with the outer sleeve. The outer sleeve may be configured to be selectively movable relative to the inner sleeve, forcing the inner sleeve to press against the first flange while the outer sleeve presses against the second flange.

A method for aligning different portions of a conduit according to an embodiment of the present disclosure is provided. The method may comprise adjustably holding a first portion of a conduit in a first position, adjustably holding a second portion of a conduit in a second position relative to the first position of the first portion of the conduit, and inserting a bellows installation tool between the first portion of the conduit and the second portion of the conduit when the bellows installation tool is in an expanded state.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of a bellows installation tool and a method of using such a tool to align different portions of a conduit according to various embodiments of the present disclosure will now be described. These various embodiments may reduce the likelihood that the bellows will crack and will need to be replaced. While particular applications may be directed to an exhaust system of an internal combustion engine and the like, it is to be understood that these various embodiments have be used in other applications.

Figure 1:
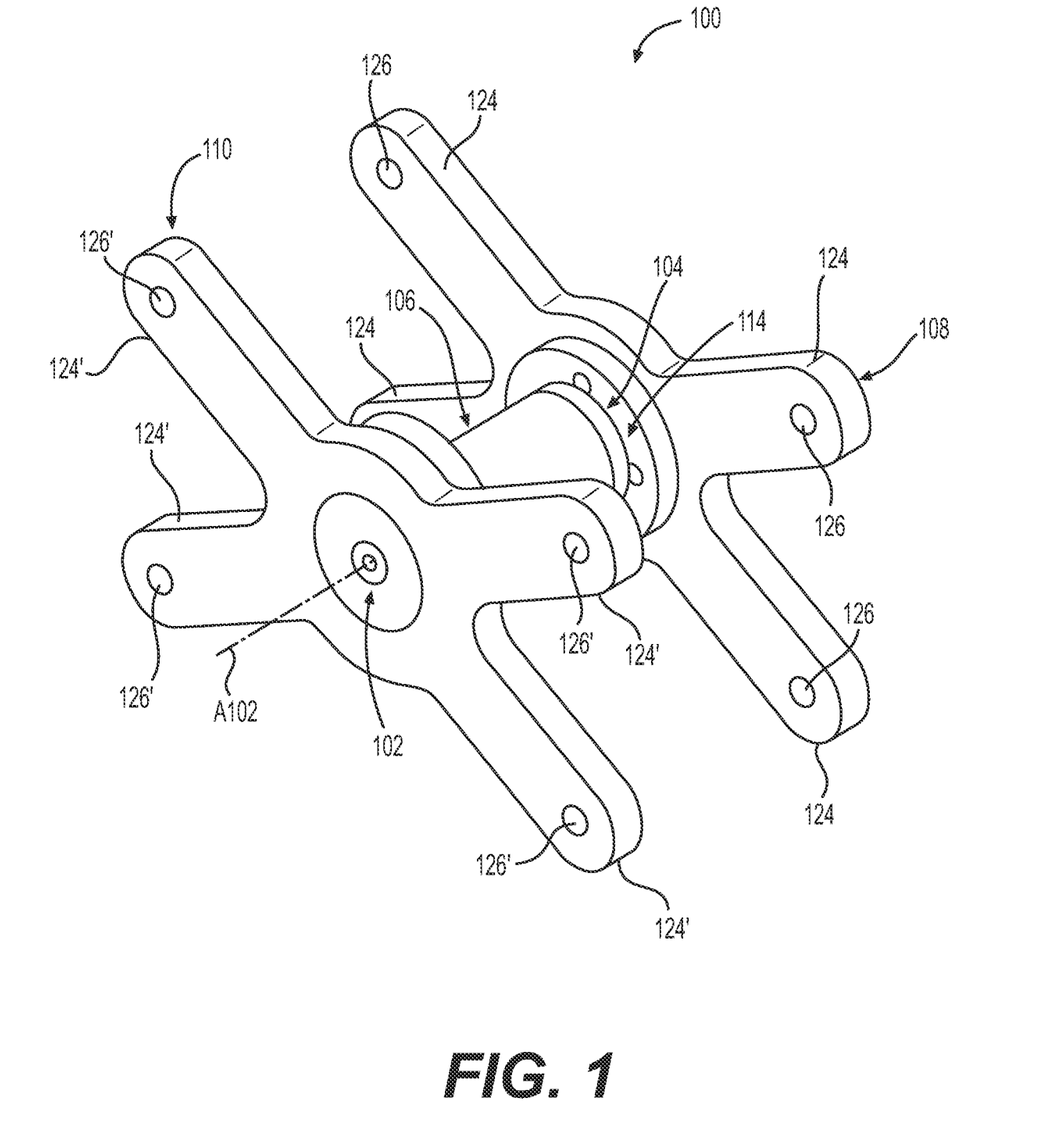
FIG. 1 is a perspective of a bellows installation tool according to various embodiments of the present disclosure.
Figure 2:
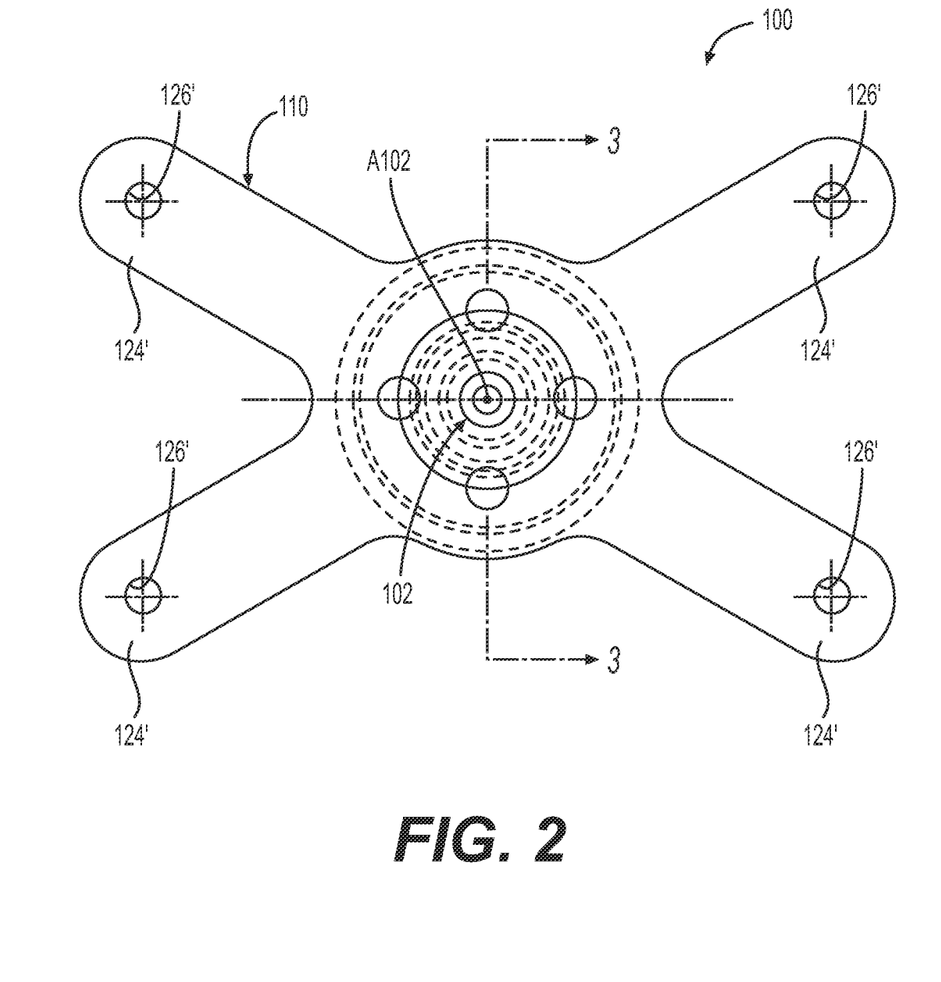
FIG. 2 is a front view of the bellows installation tool of FIG. 1.
Figure 3:
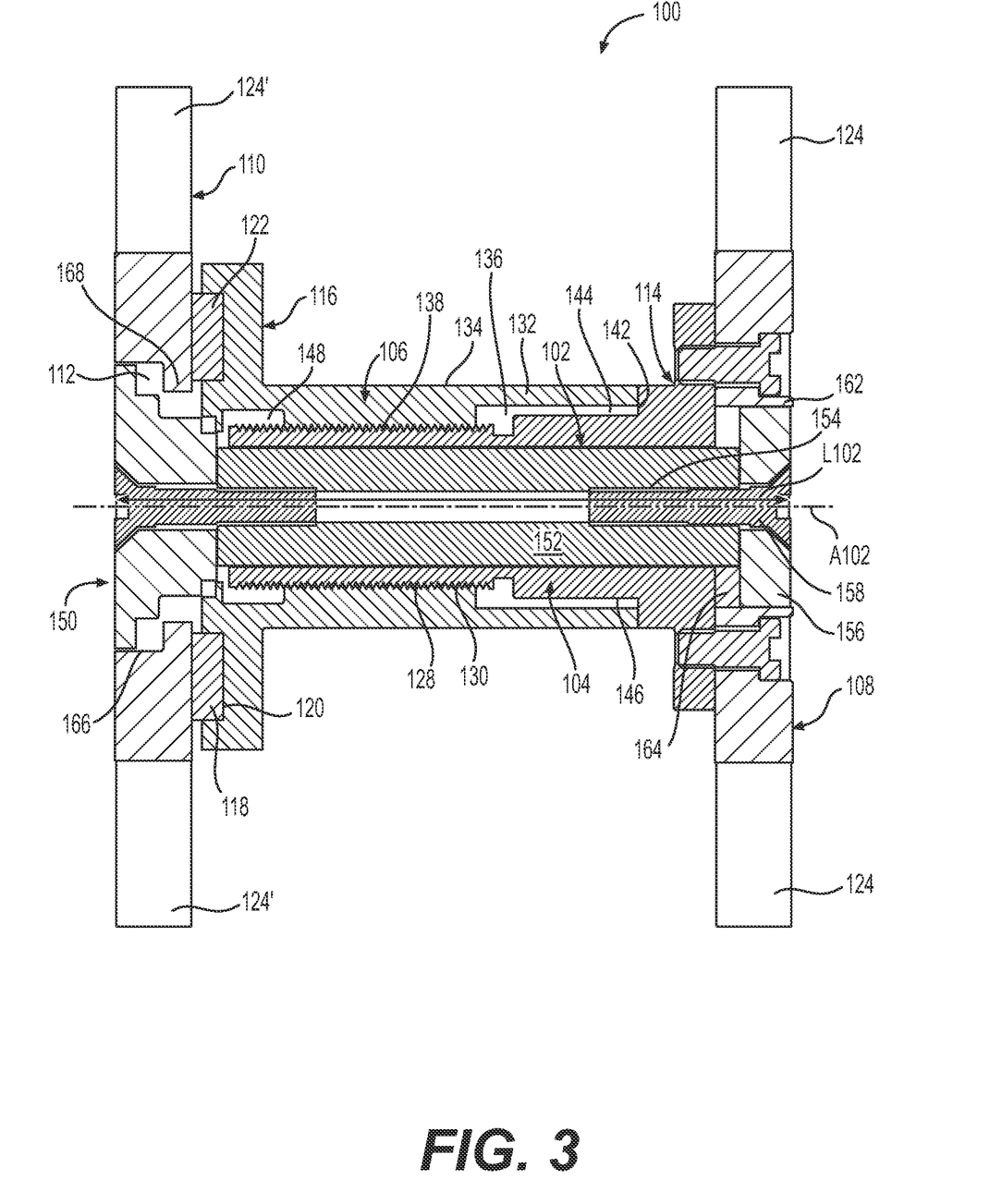
FIG. 3 is a sectional view of the bellows installation tool of FIG. 2 taken along lines 3-3 thereof, showing the bellows installation tool in a collapsed state.

Looking at FIGS. 1 thru 4, a bellows installation tool 100 according to various embodiment of the present disclosure will now be discussed. As best seen in FIG. 3, the bellows installation tool 100 may comprise a spacer 102 defining a longitudinal axis A102 and a fixed axial length L102, an inner sleeve 104 that is at least partially disposed about the spacer 102, an outer sleeve 106 that is at least partially disposed about the inner sleeve 104, a first flange 108 that is disposed axially proximate the inner sleeve 104 and that is operatively associated with the inner sleeve 104, and a second flange 110 that is disposed axially proximate the outer sleeve 106 and that is operatively associated with the outer sleeve 106.

More specifically, the outer sleeve 106 may be configured to be selectively movable relative to the inner sleeve 104, forcing the inner sleeve 104 to press against the first flange 108 while the outer sleeve 106 presses against the second flange 110. In reverse, the outer sleeve 106 may also be selectively movable relative to the inner sleeve 104 so that the outer sleeve moves away from the second flange 110, creating an internal gap 112 (see FIG. 3) between the spacer 102 and the second flange 110 that may allow the bellows installation tool 100 to collapse (i.e. the second flange 110 may move to the right in FIG. 3 away from a portion of a conduit), allowing its removal from between different portions of a conduit.

With continued reference to FIG. 3, the inner sleeve 104 may include an inner sleeve head portion 114 and the first flange 108 may be fastened to the inner sleeve head portion 114, fixing the position of the inner sleeve 104 relative to the first flange 108. On the other hand, the outer sleeve 106 may include an outer sleeve head portion 116 that is rotatable relative to the second flange 110.

For the embodiment shown in FIGS. 1 thru 4, the inner sleeve head portion 114 has a stepped cylindrical configuration while the outer sleeve head portion 116 has a simple cylindrical configuration. These configurations may be altered to be different in other embodiments.

Since the outer sleeve head portion 116 is rotatable relative to the second flange 110, a bearing 118 may be disposed between the outer sleeve head portion 116 and the second flange 110 in order to help prevent galling. The outer sleeve head portion 116 may define an annular slot 120. The bearing 118 may take the form of a nylon washer 122 that is disposed in the annular slot 120 (e.g. press fitted into the annular slot), being configured to contact both the outer sleeve head portion 116 and the second flange 110. Other types of bearings may be employed.

Referring again to FIGS. 1 thru 4, the first flange 108 may include an X-shaped configuration including four arms 124, and each of the four arms 124 may define a threaded hole 126. The second flange 110 may be similarly configured as the first flange 108. That is to say, the second flange 110 may also include an X-shaped configuration including four arms 124', and each of the four arms 124' may define a threaded hole 126'. Hence, the bellows installation tool 100 may be readily attached and detached via bolts extending through the bolt holes of the portions of the exhaust manifold (see FIGS. 5 thru 8).

Figure 4:
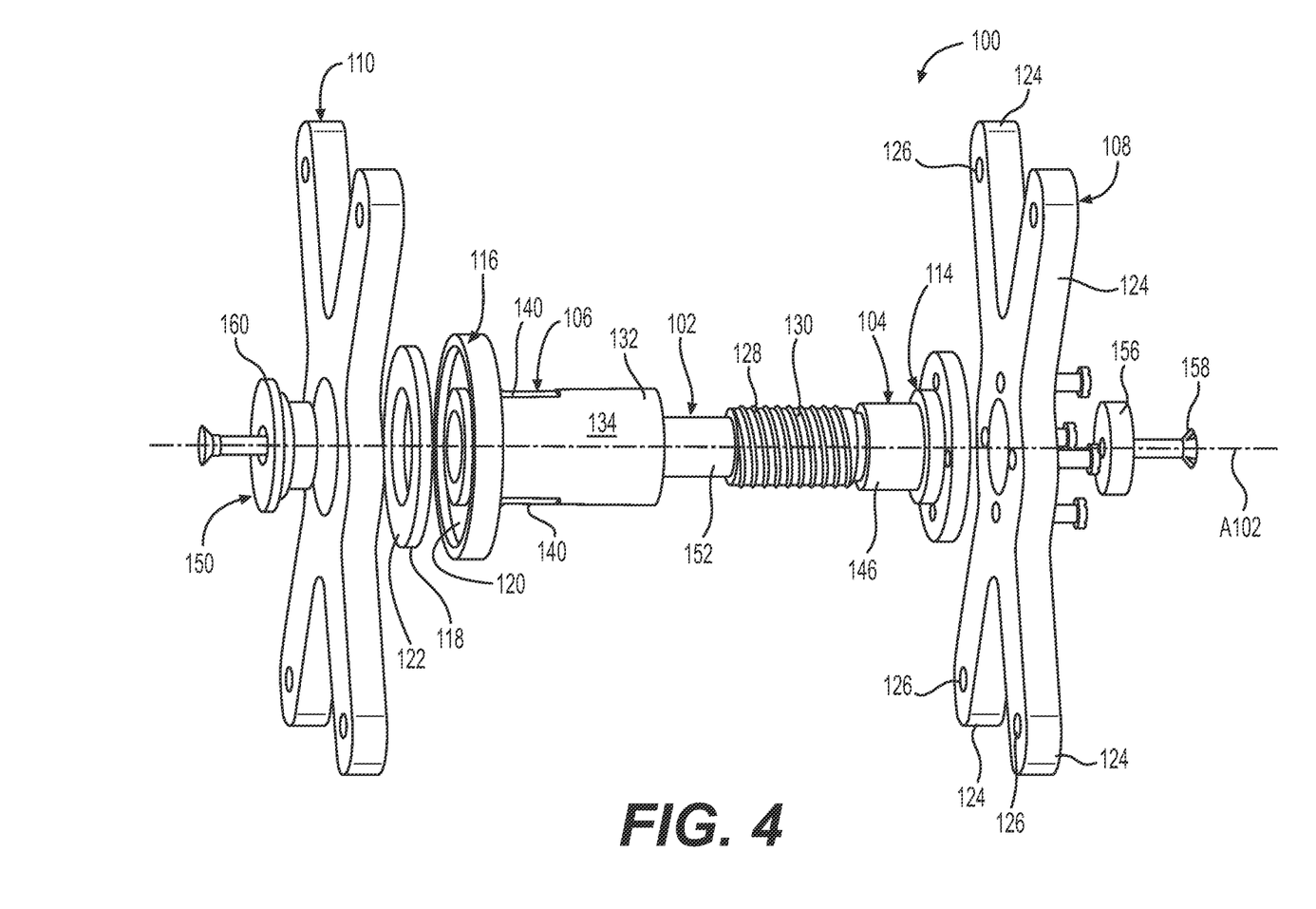
FIG. 4 is an exploded assembly view of the bellows installation tool of FIG. 1.
Figure 5:
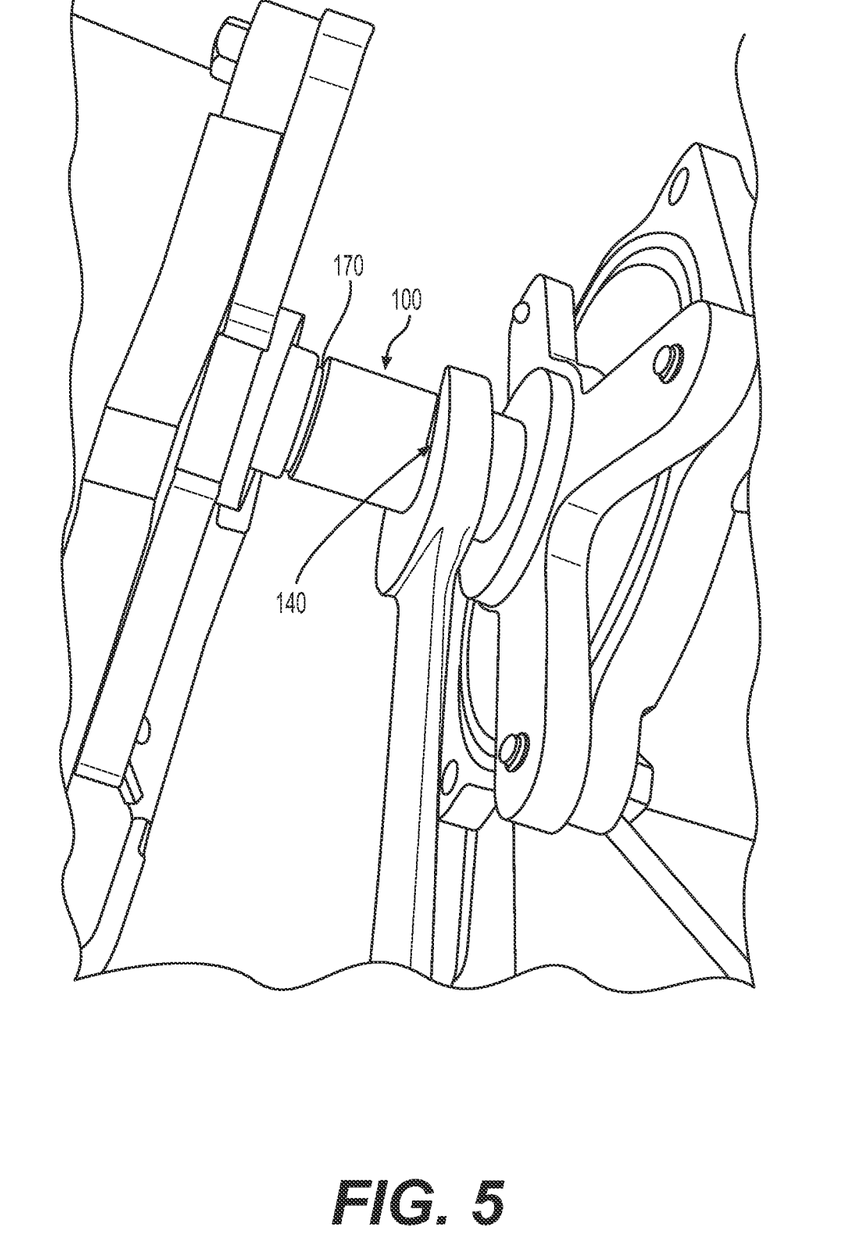
FIG. 5 illustrates the bellows installation tool in an expanded state where alignment of two different sections of the exhaust manifold is taking place. A wrench is show that is used to rotate the outer sleeve to expand or collapse the bellows installation tool.
Figure 6:
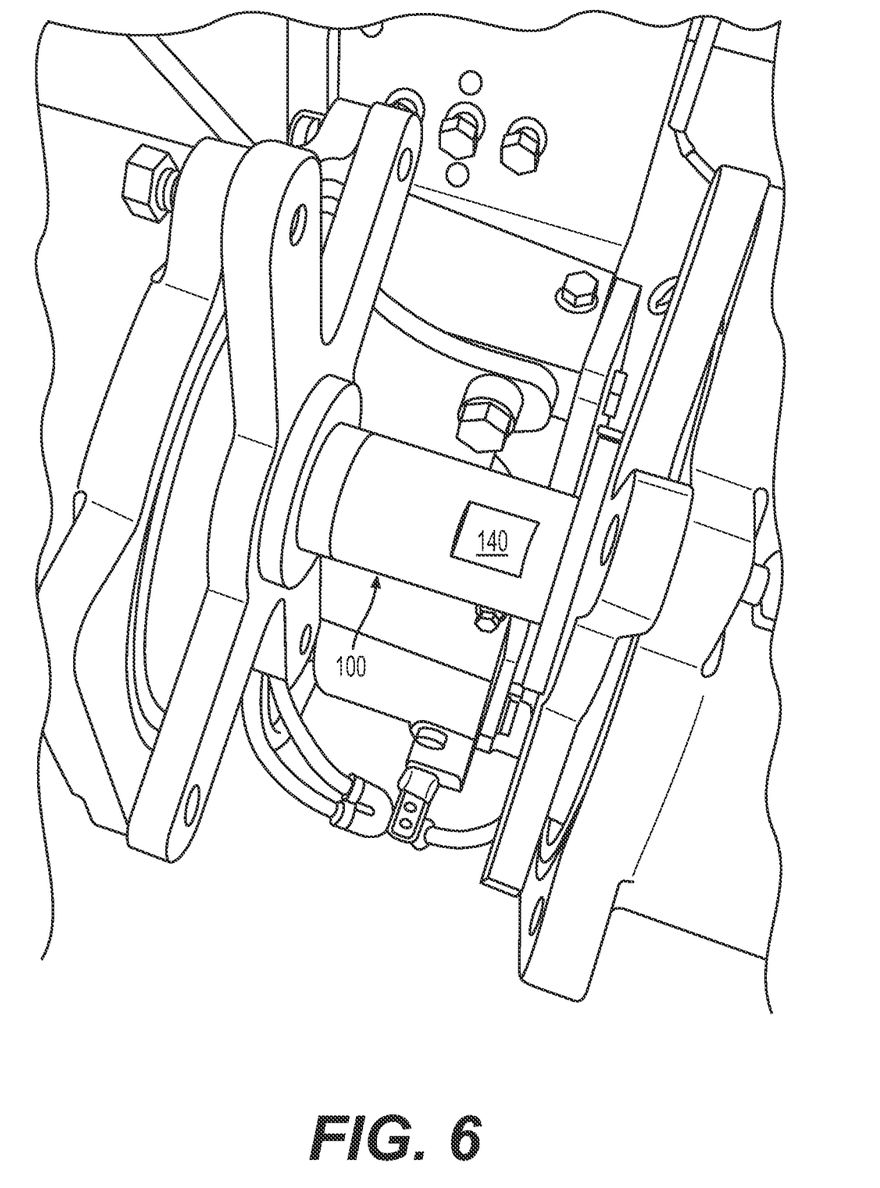
FIG. 6 depicts the bellows installation tool of FIG. 5 after it has been collapsed by rotating the outer sleeve via a wrench (the wrench is shown removed revealing the flats that the wrench engages). Now, the bellows installation tool is ready to be removed from the different sections of the exhaust manifold.
Figure 7:
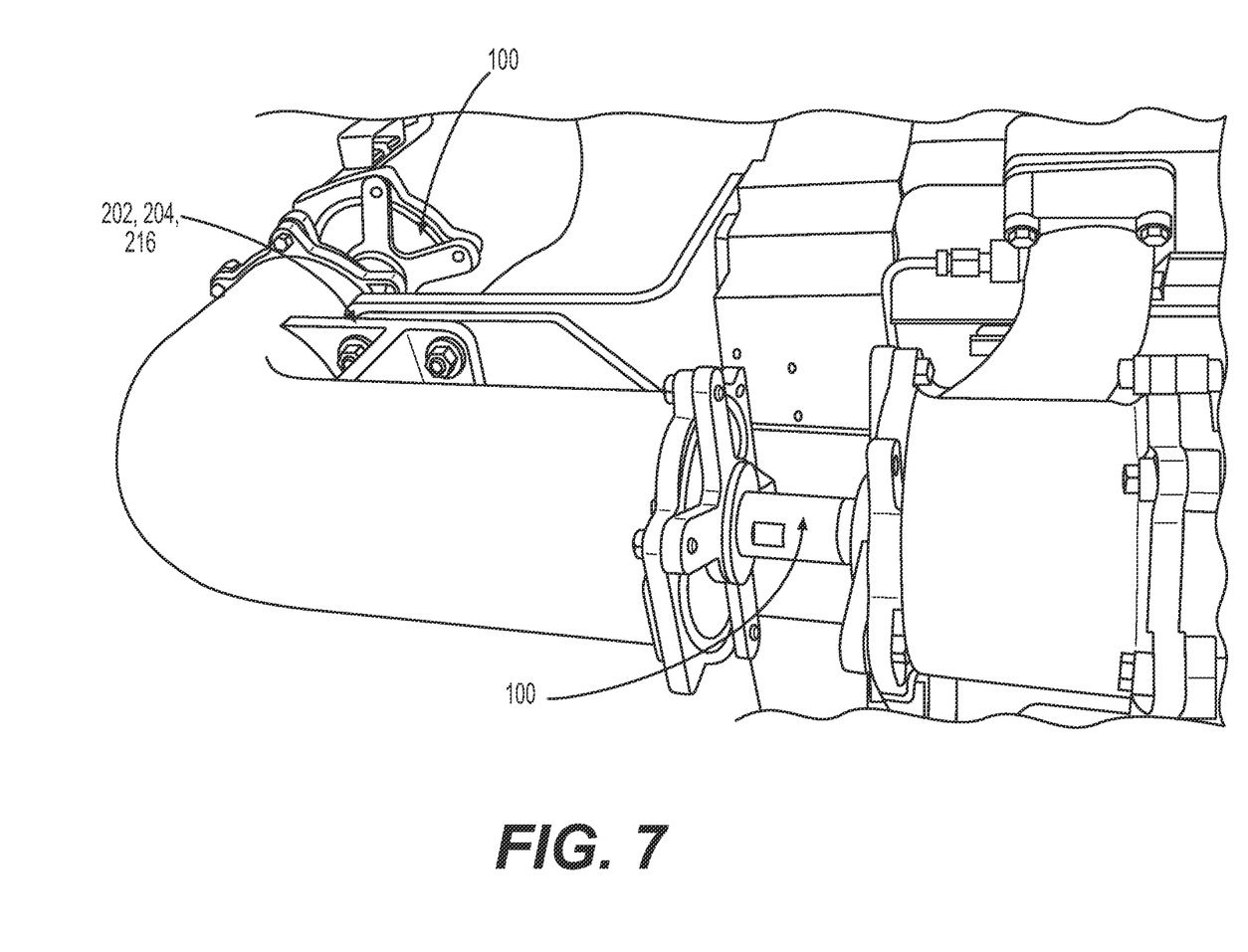
FIG. 7 illustrates two different bellows installation tools being used to properly align a right angle elbow section of the exhaust manifold to portions of the engine.

Focusing on FIGS. 3 and 4, the inner sleeve 104 includes a shaft portion 128 including external threads 130, while the outer sleeve 106 includes a cylindrical portion 132 including an exterior surface 134 and defining a central thru-aperture 136. The cylindrical portion 132 may include internal threads 138 disposed in the central thru-aperture 136 that engage the external threads 130 of the inner sleeve 104. Also, a plurality of flats 140 may be machined onto the exterior surface 134 of the cylindrical portion 132 so that a wrench may rotate the outer sleeve 106 (flats 140 are best seen in FIGS. 4 thru 6).

Looking at FIG. 3, the outer sleeve 106 may include an outer sleeve free end 142 disposed axially opposite the outer sleeve head portion 116 and the central thru-aperture 136 may include a first clearance void 144 disposed axially between the outer sleeve free end 142 and the internal threads 138 of the outer sleeve 106. The inner sleeve 104 may include an intermediate portion 146 disposed axially between the inner sleeve head portion 114 and the shaft portion 128 of the inner sleeve 104. The intermediate portion 146 of the inner sleeve 104 may be at least partially disposed in the first clearance void 144 of the outer sleeve 106.

In addition, the central thru-aperture 136 of the outer sleeve 106 may include a second clearance void 148 that is disposed axially between the outer sleeve head portion 116 and the internal threads 138 of the outer sleeve 106. The shaft portion 128 of the inner sleeve 104 may be at least partially disposed axially in the second clearance void 148. Other configurations of these various features and spatial relationships between these various features are possible in other embodiments.

Looking at the spacer 102 as best seen in FIG. 3, the spacer 102 may take the form of a spacer assembly 150 that may comprise a tubular spacer member 152 including a central threaded hole 154, a first end cap 156 fastened to the tubular spacer member 152 via a first fastener 158 engaging the first end cap 156 and the central threaded hole 154, and a second end cap 160 fastened to the tubular spacer member 152 via a second fastener 158' engaging the second end cap 160 and the central threaded hole 154.

The first end cap 156 may include a cylindrical configuration and the first flange 108 may define a first flange aperture 162 that is at least partially complimentarily configured to the first end cap 156 and that is configured to receive the first end cap 156. The first flange 108 may also include a first flange stop portion 164 that is configured to abut the first end cap 156.

Similarly, the second end cap 160 may include a stepped cylindrical configuration and the second flange 110 may define a second flange aperture 166 that is at least partially complimentarily configured to the second end cap 160 and that is configured to receive the second end cap 160. The second flange 110 may also include a second flange stop portion 168 that is configured to abut the second end cap 160. Other configurations for the spacer assembly and its components are possible in other embodiments. For example, the spacer may take the form of a unitary component, etc.

The various components of the bellows installation tool may be manufactured using any suitable manufacturing process or material. For example, any of its components may be machined using steel, cast iron, steel-cast iron, etc. The bearing may take the form of a machined or commercially available nylon washer, etc.

INDUSTRIAL APPLICABILITY

In practice, a bellows installation tool, or an apparatus (e.g. an engine or a machine using an engine) with bellows having been installed using the bellows installation tool or an associated method of aligning different portions of a conduit according to any embodiment described herein may be sold, bought, manufactured or otherwise obtained in an OEM or after-market context.

Other applications are possible other than engines and exhaust systems for other embodiments of the present disclosure, etc.

Figure 9:
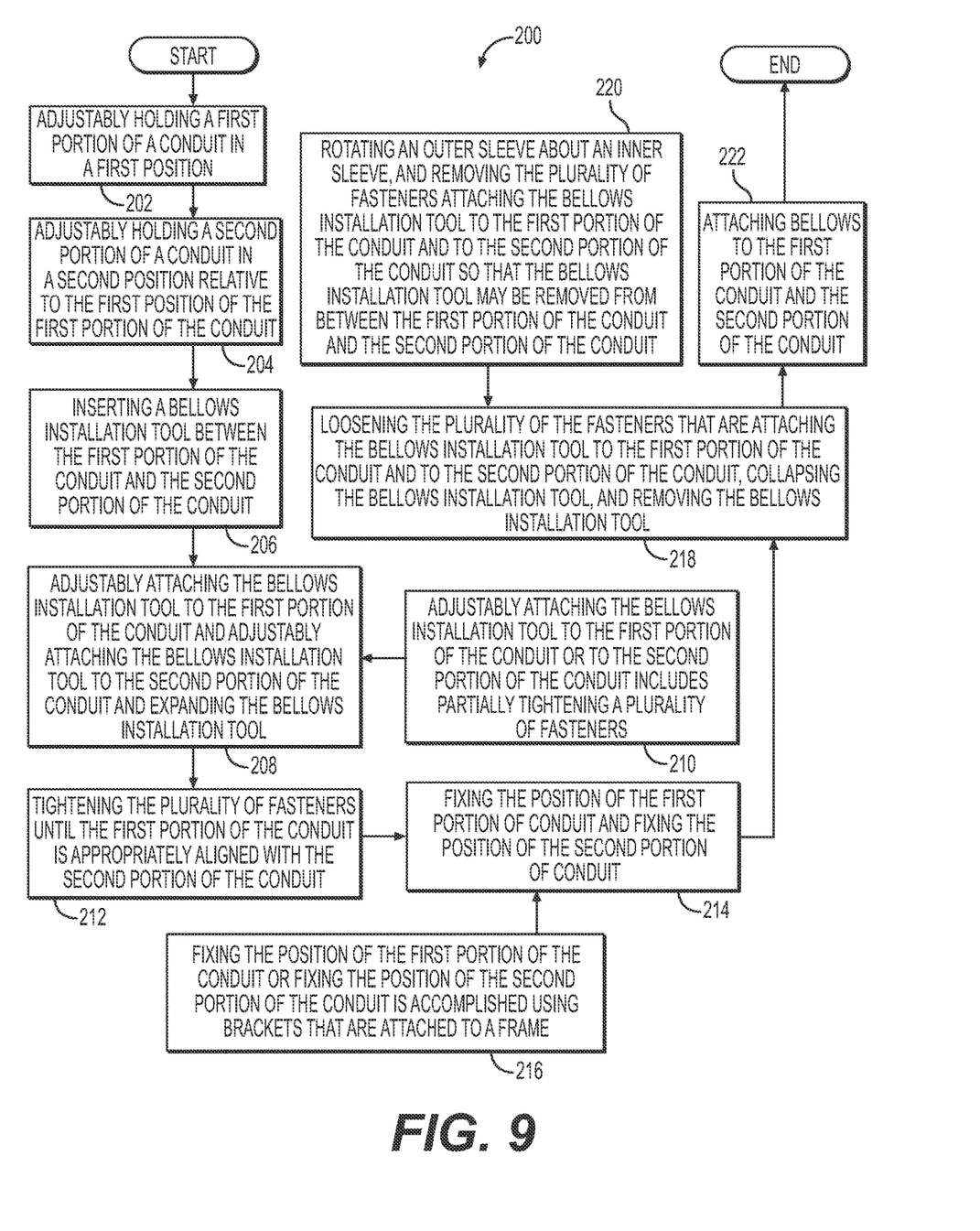
FIG. 9 is a flowchart depicting a method of aligning different portions of a conduit and installing bellows to the aligned portions of the conduit according to an embodiment of the present disclosure.

FIG. 9 depicts a method 200 for aligning different portions of a conduit. The method 200 may comprise the following steps:

adjustably holding a first portion of a conduit in a first position (step 202);

adjustably holding a second portion of a conduit in a second position relative to the first position of the first portion of the conduit (step 204); and inserting a bellows installation tool between the first portion of the conduit and the second portion of the conduit (step 206).

Steps 202 and 204 may be accomplished using fasteners and a brackets that connect the portions of the conduit loosely to a frame. For example, the fasteners may be only partially tightened (see FIG. 7).

As best understood with reference to FIGS. 6 and 9, the method 200 may further comprise adjustably attaching the bellows installation tool to the first portion of the conduit and adjustably attaching the bellows installation tool the second portion of the conduit and expanding the bellows installation tool (step 208). Step 208 may be achieved by partially tightening a plurality of fasteners (step 210). More particularly, the bellows installation tool may be inserted between the different portions of the conduit in a collapsed state (see FIG. 3) and then expanded so that the internal gap 112 (see FIG. 3) is converted to an external gap 170 (see FIG. 5). As alluded to earlier herein, this may be achieved by rotating the outer sleeve using a wrench. In other cases, the bellows installation tool may already be expanded when it is inserted between the different portions of the conduit.

Referring to FIG. 9, the method 200 may further comprise tightening the plurality of fasteners until the first portion of the conduit is appropriately aligned with the second portion of the conduit (step 212).

Then, fixing the position of the first portion of conduit and fixing the position of the second portion of conduit (step 214) may be accomplished. Fixing the position of the first portion of the conduit or fixing the position of the second portion of the conduit is accomplished using brackets that are fastened to a frame and the first portion of the conduit or the second portion of the conduit by fully tightening the fasteners (step 216, see also FIG. 7).

Next, the method 200 may further comprise loosening the plurality of fasteners that are attaching the bellows installation tool to the first portion of the conduit and to the second portion of the conduit, collapsing the bellows installation tool, and removing the bellows installation tool (218).

Step 218 may be accomplished by rotating an outer sleeve about an inner sleeve, and removing the plurality of fasteners attaching the bellows installation tool to the first portion of the conduit and to the second portion of the conduit so that the bellows installation tool may be removed from between the first portion of the conduit and the second portion of the conduit (step 220).

Figure 8:
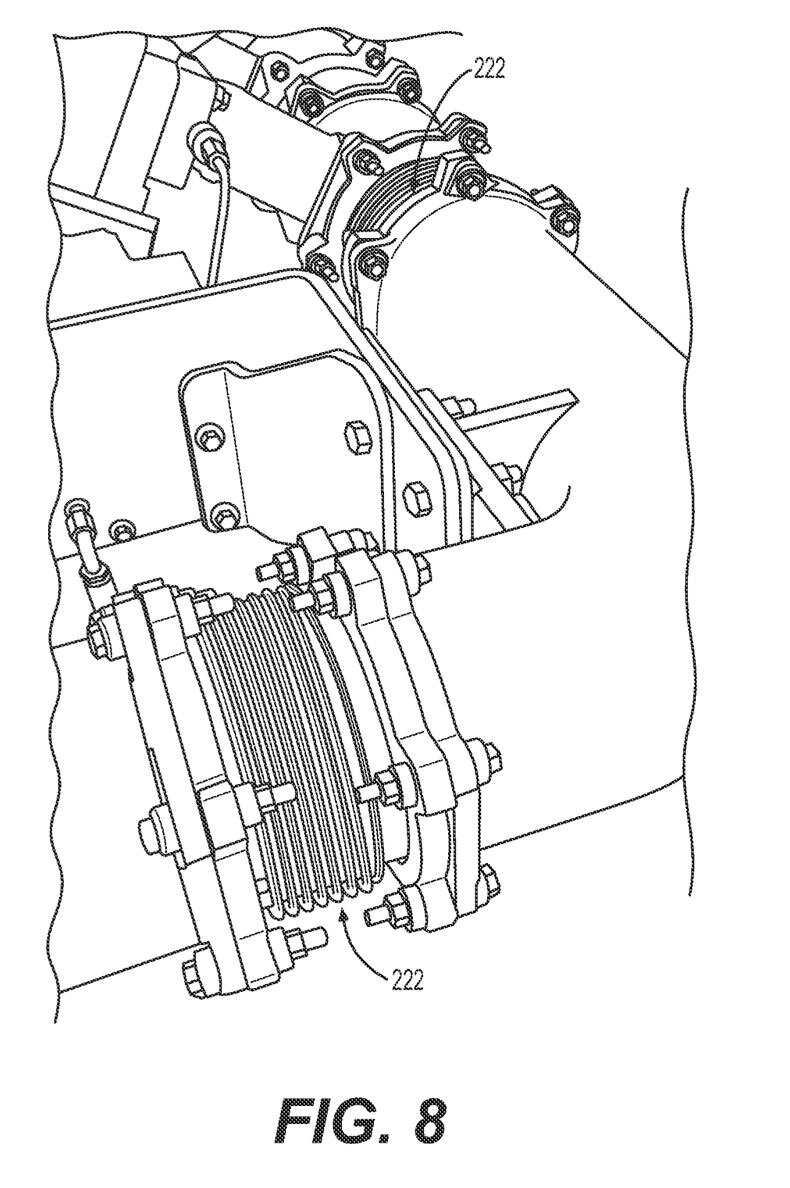
FIG. 8 shows the right angle elbow section of the exhaust manifold of FIG. 7 after the two different bellows have been attached after removing the bellows installation tools.

Then, the method 200 may include attaching bellows to the first portion of the conduit and to the second portion of conduit (step 222, see also FIG. 8).

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A method for assembling a conduit, the conduit including a first portion, a second portion, and a bellows connecting the first and second portions, the method comprising:
   adjustably holding the first portion of the conduit in a first position;
   adjustably holding the second portion of the conduit in a second position relative to the first position of the first portion of the conduit;
   adjustably attaching a bellows installation tool to the first portion of the conduit and adjustably attaching the bellows installation tool the second portion of the conduit;
   setting the bellows installation tool to a desired length;
   fixing the bellows installation tool to the first portion of the conduit and the second portion of the conduit;
   fixing a position of the first portion of the conduit and a position of the second portion of the conduit;
   removing the bellows installation tool from the first portion of the conduit and the second portion of the conduit; and
   fixing the bellows between the first portion of the conduit and the second portion of the conduit.

2. The method of claim 1, further including disposing the bellows installation tool directly between the first portion of the conduit and the second portion of the conduit.

3. The method of claim 2, wherein the step of disposing the bellows installation tool directly between the first portion of the conduit and the second portion of the conduit includes disposing the bellows installation tool in-line with the first and second portions of the conduit.

4. The method of claim 1, wherein the step of setting the bellows installation tool to the desired length includes expanding the bellows installation tool.

5. The method of claim 4, further comprising collapsing the bellows installation tool prior to removing the bellows installation tool from the first portion of the conduit and the second portion of the conduit.

6. The method of claim 1, wherein the step of adjustably attaching the bellows installation tool to the first portion of the conduit and to the second portion of the conduit includes partially tightening a plurality of fasteners.

7. The method of claim 6, wherein the step of fixing the bellows installation tool to the first portion of the conduit and the second portion of the conduit includes tightening the plurality of fasteners until the first portion of the conduit is aligned with the second portion of the conduit.

8. The method of claim 7, wherein the step of fixing the position of the first portion of the conduit and the position of the second portion of the conduit includes fixing the first portion of the conduit and the second portion of the conduit to brackets on a frame by fully tightening a second plurality of fasteners.

9. The method of claim 8, wherein the steps of adjustably holding the first portion of the conduit in the first position and adjustably holding the second portion of the conduit in the second position include partially tightening the second plurality of fasteners.

10. The method of claim 1, wherein the step of removing the bellows installation tool from the first portion of the conduit and the second portion of the conduit includes loosening the plurality of fasteners that are attaching the bellows installation tool to the first portion of the conduit and to the second portion of the conduit, collapsing the bellows installation tool, and removing the bellows installation tool.

11. The method of claim 10, wherein the step of collapsing the bellows installation tool includes removing at least some of the plurality of fasteners attaching the bellows installation tool to the first portion of the conduit and to the second portion of the conduit and rotating an outer sleeve about an inner sleeve to collapse the bellows installation tool from the desired length.

12. The method of claim 10 wherein the steps of collapsing and removing the bellows installation tool include removing the plurality of fasteners attaching the bellows installation tool to the first portion of the conduit and to the second portion of the conduit so that the bellows installation tool and rotating an outer sleeve about an inner sleeve.

13. A method for assembling a conduit, the conduit including a first portion, a second portion, and a bellows connecting the first and second portions, the method comprising:
   adjustably holding the first portion of the conduit in a first position;
   adjustably holding the second portion of the conduit in a second position relative to the first position of the first portion of the conduit;
   disposing the bellows installation tool directly between the first portion of the conduit and the second portion of the conduit;
   adjustably attaching a bellows installation tool to the first portion of the conduit and adjustably attaching the bellows installation tool the second portion of the conduit including partially tightening a first plurality of fasteners;
   setting the bellows installation tool to a desired length;
   fixing the bellows installation tool to the first portion of the conduit and the second portion of the conduit including tightening the plurality of fasteners until the first portion of the conduit is aligned with the second portion of the conduit;
   fixing a position of the first portion of the conduit and a position of the second portion of the conduit;
   removing the bellows installation tool from the first portion of the conduit and the second portion of the conduit; and
   fixing the bellows between the first portion of the conduit and the second portion of the conduit.

14. The method of claim 13, wherein the step of disposing the bellows installation tool directly between the first portion of the conduit and the second portion of the conduit includes disposing the bellows installation tool in-line with the first and second portions of the conduit.

15. The method of claim 13, wherein the step of setting the bellows installation tool to the desired length includes expanding the bellows installation tool.

16. The method of claim 15, further comprising collapsing the bellows installation tool prior to removing the bellows installation tool from the first portion of the conduit and the second portion of the conduit.

17. The method of claim 13, wherein the step of fixing the position of the first portion of the conduit and the position of the second portion of the conduit includes fixing the first portion of the conduit and the second portion of the conduit to brackets on a frame by fully tightening a second plurality of fasteners.

18. The method of claim 17, wherein the steps of adjustably holding the first portion of the conduit in the first position and adjustably holding the second portion of the conduit in the second position include partially tightening the second plurality of fasteners.

19. The method of claim 13, wherein the step of removing the bellows installation tool from the first portion of the conduit and the second portion of the conduit includes loosening the plurality of fasteners that are attaching the bellows installation tool to the first portion of the conduit and to the second portion of the conduit, collapsing the bellows installation tool, and removing the bellows installation tool.

20. The method of claim 19 wherein the steps of collapsing and removing the bellows installation tool include removing the plurality of fasteners attaching the bellows installation tool to the first portion of the conduit and to the second portion of the conduit so that the bellows installation tool and rotating an outer sleeve about an inner sleeve.

* * * * *